United States Patent Office 2,930,829
Patented Mar. 29, 1960

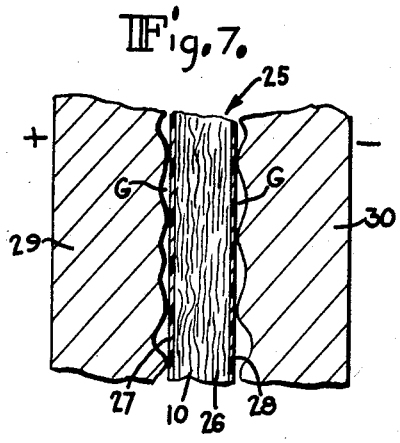
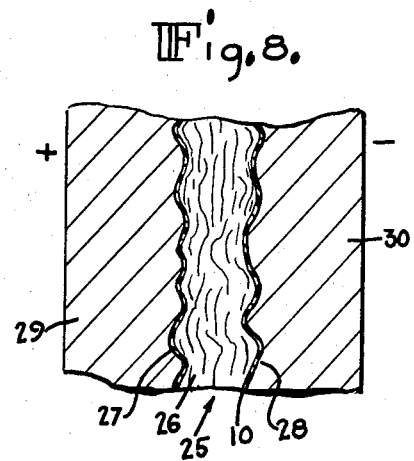
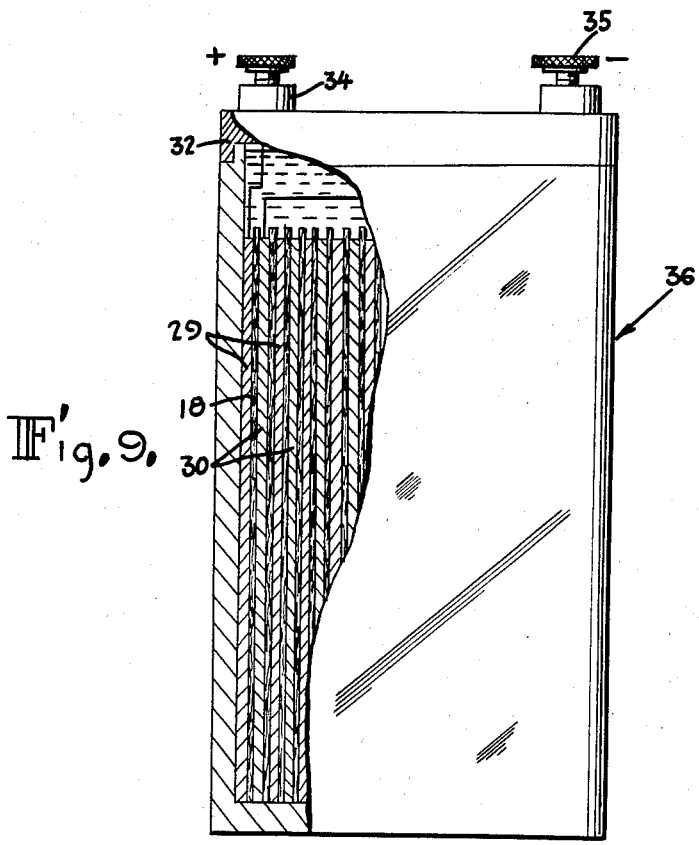

2,930,829

GAS TIGHT ELECTROLYTIC CELLS AND GAS TIGHT ALKALINE STORAGE CELLS AND SEPARATORS THEREFOR

Pierre A. C. Jacquier, Paris, France, assignor to Societe des Accumulateurs Fixes et de Traction (Societe Anonyme), Romainville, France, a company of France Application April 17, 1957, Serial No. 653,314

Claims priority, application France May 5, 1956

15 Claims. (Cl. 136—143)

This invention relates to electrolytic cells and more particularly to alkaline storage cells which are constructed so that they evolve practically no gas during use or in charging. In consequence they may be permanently closed and sealed after filling with electrolyte without noticeable increase in internal pressure during use or during charging or especially during overcharging.

Cells and storage batteries of this type have already been disclosed in U.S. Patent No. 2,646,455 to Jeannin, dated July 21, 1953. Such electrolytic cells and batteries comprise separators positioned between electrodes, at least the surfaces of said electrodes being microporous, said separators being thin and able to retain the electrolyte, and being closely engaged by the opposite faces of adjacent electrodes. More especially as has been described in said patent, the close engagement of the separator with the surface of the electrodes is obtained by compressing the assembled stack of the electrode plates and separators with high pressures and maintaining the said stack in such compressed state during the lives of the cells and batteries.

In such cells, the separators have been preferably made as thin as possible so that the opposite face of the adjoining electrodes when compressed are brought extremely close together. Such arrangement has been found particularly useful in alkaline storage batteries and more especially in those in which the positive electrodes contain nickel hydroxide and the negative electrodes, cadmium.

An objectionable feature with respect to the Jeannin type storage batteries has been found in their tendency to lose a part of their charge while idle. Moreover, they have been found in some instances not to give constant and reproducible results particularly when operating at high current rate and repeated discharges.

It is believed that these disadvantages may be attributed to a lack of perfect contact between the electrode plates and the separators notwithstanding the fact that high pressures (more than 100 kg./cm.²) have been used for compressing and closely engaging the faces of the plates and of the separators. Furthermore, these disadvantages appear to exist especially when the separators utilized have had low retention capacities for the electrolyte.

In addition, it has been found that increasing the amount of compression pressure applied to the assembled plates and separators does not materially improve the functioning of these storage batteries. In consequence, objects and features of the present invention have been to provide improved battery operation and new ways for obtaining close engagement of the plates on their entire surfaces with the adjoining surfaces of the separators.

The improved batteries of the type in question have lead to an unexpected result in that with the practice of the instant invention it has been found possible to increase the distance between adjoining plates of opposite polarities while actual functioning of the batteries as before, remains without substantial evolution of gas. This unexpected result occurs even though it previously seemed that better functioning could be promoted by closer spacing of the plates of opposite polarity.

An additional unexpected result of the practice of the present invention has been that storage batteries made in accordance with it have an increase in retention of electrolyte by the cells. In consequence, such batteries have been found particularly satisfying when functioning at high current discharging rate (with very high intensity) and with repeated discharges required.

Moreover, as a further novel feature, the retention of the charge by the cells and batteries while idle has been distinctly improved.

These results have been found to occur by placing separators between adjacent electrodes of opposite polarities in the battery cells, the electrodes being prevented from spreading apart by confining enclosure means and said separators being fabricated of highly absorbent elements, said elements being assembled in such a way as to form a reticulated structure and being capable of swelling when wet, and saturating the separators with the electrolyte after their assembly with electrodes in the cells.

Preferably he highly absorbent elements are fibers either natural or synthetic cellulose (e.g. rayon). Cellulosic fibers as used herein is intended to denote either variety or combinations thereof. In order to obtain a reticulated structure these cellulosic fibers may be agglomerated by felting. However, in order to reduce the thickness of the separators, and thus to limit the distance between plates, it is advantageous to arrange rather long cellulosic fibers in flat layers, in which layers the fibers are disposed in substantially parallel lines but making the fibers in the layers overlap and intermingle. In order to provide for the physical strength of the separators, the said fibers are united at least in spots as by a cellulosic binder (e.g. viscose). In order that separators may be obtained that are without visible apertures, several fiber layers may be superposed and bonded together for example with cellulosic binder at their interfaces. The separator product so obtained is similar to what is known commercially as a "non-woven" fabric. Such "non-woven" fabric may be used as separators in practicing the invention.

It is preferable, however, to use more complex arrangements, for example, separators comprising a thin pervious insulating backing unaltered by the electrolyte covered on at least one side with a layer of absorbent fibers, or else providing separators comprising a mixture of insulating fibers unaltered by the electrolyte, for example, plastic materials unaltered by potassium hydroxide (polyamides, polyvinyl chloride, and its copolymers), and absorbent cellulosic fibers arranged either in the same layers, as by intermingling, or in distinct layers. In a further embodiment a flat layer of long absorbent cellulosic fibers more or less intermingled with each other and reticulate in structure may be disposed between two outside layers of long insulating non-absorbent fibers of the insulating plastic materials hereinabove specified.

In a further embodiment, fabrics either of woven or of non-woven fibers unaltered by the electrolyte and of the plastic materials above specified may have one face at least thereof covered by an absorbent cellulosic fibrous layer, or a coating of absorbent particles arranged as a reticulated layer may be applied to such fabrics.

Objects and features of the invention are the provision of novel separators having the features hereinabove specified and the provision of cells and storage batteries utilizing such separators with all the advantages herein above mentioned.

Further objects and features of the invention are the provision of gas tight electrolytic cells and of storage batteries of the alkaline type made of these cells in which the problem of evolution of gas is eliminated, without requiring compression of the electrode assemblies either in the formation of the cells and the batteries.

Additional objects and features of the invention are the provision of electrolytic cells and batteries of the alkaline type which have long life and do not lose part of their charge when idle.

Other objects and features of the invention will become apparent from the following description and the accompanying drawing wherein:

Figure 7 is a cross sectional view on an enlarged scale of a pair of electrodes of opposite polarity with a separator embodying the invention interposed between them prior to saturation with electrolyte;

Figure 8 is a similar section of the same components showing the expanded, electrolyte-saturated separator in relationship to the same electrodes and illustrating the resulting and desired intimate contact between adjoining faces of the separator and the electrodes; and Figure 9 is a partially sectionalized elevational view of an assembled electrolytic cell embodying the invention.

Figure 1:
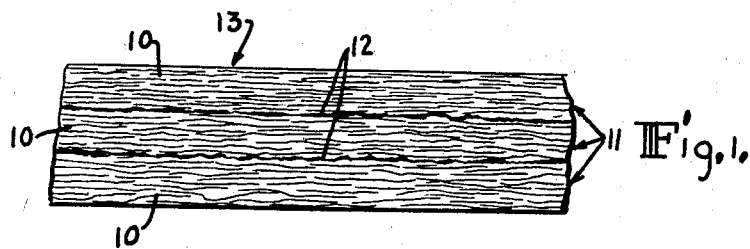
Figure 1 is a side elevation on an exaggerated scale of one form of separator made in accordance with this invention comprising united layers of absorbent long cellulosic fibers.

Referring to the drawing and first to Figure 1 long fibers 10 of absorbent materials such as natural or artificial cellulosic material are arranged in flat layers 11 wherein the fibers are disposed in substantial parallelism. However, these fibers overlap and intermingle and thus provide a substantially reticulate mass in each layer 11. To insure physical strength of these layers 11 a cellulosic binder such as viscose may be applied at random to various random fibers to provide spot junctions between such and adjacent fibers. In addition, in order to provide separators with no visible apertures, several layers 11 may be superposed and bonded together at their interfaces as by a cellulosic viscose binder 12. The multiple layer separator 13 resulting is substantially without apertures and has its substantially parallelly disposed cellulosic fibers bonded together at random points and its layers joined also, producing a product similar to commercial product "non-woven" fabrics. Separators 13 of this character may be utilized in preparing cells and storage batteries embodying the invention.

Figure 2:
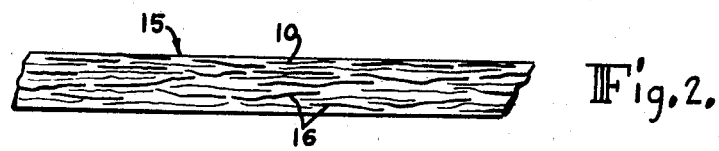
Figure 2 is a similar view of another form of separator embodying the invention wherein intermingled insulating and absorbent fibers are utilized.

However, more complex separator structures are preferred. For example, the separator 15 of Figure 2 is comprised of a mixture of absorbent cellulosic fibers 10 with long insulating fibers 16 the later being unaltered by the electrolyte. The insulating fibers 16 may be composed of plastics that are uneffected by potassium hydroxide, for example, long fibers made of polyamides, polyvinyl chloride and its copolymers and other plastics may be used. The intermingled cellulosic fibers 16 and 16 are disposed in substantially parallelism with some cross over to provide reticulation and may be bonded for strength at random points, for example, with a cellulosic binder such as viscose. In addition, if desired, several layers of the separator fibers 10 and insulating fibers 16 may be arranged in superposed relationship (not shown) in a manner similar to the arrangement of the layers 11 in Figure 1.

Figure 3:
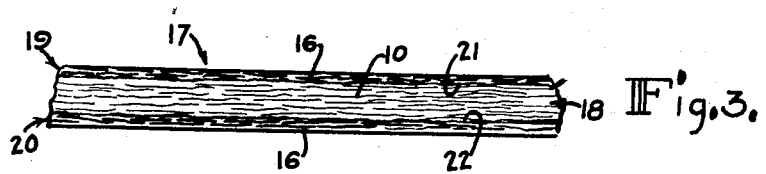
Figure 3 is a similar view of a separator embodying the invention wherein a layer of long absorbent fibers is positioned between outer layers of long insulating fibers.

Further separator construction 17 is shown in Figure 3 wherein a layer 18 of reticulated cellulosic fibers 10 is disposed between two layers 19 and 20 of substantially parallel but partially reticulate long insulating fibers 16, the layers being bonded at their interfaces 21 and 22 as by a binder.

Figure 4:
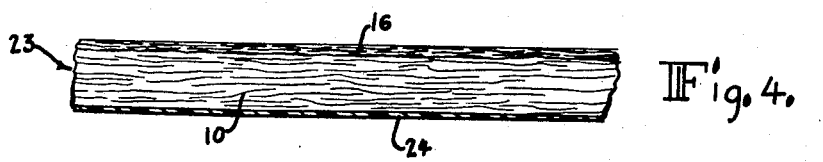
Figure 4 is a similar view of a separator embodying the invention comprising adjoining layers of insulating fabric and cellulosic absorbent fibers.

In a further embodiment, as seen in Figure 4, a separator 22 composed of a reticulated layer 23 of cellulosic fibers 10 joined at one face to a layer of thin fabric of polyamide or the like or of parallelly disposed insulating fibers 16 may be provided. The reticulate layer of cellulosic fibers 10 may be provided on its external face with a smooth calender surface 24 composed of the cellulosic bonding adhesive (viscose).

Figure 5:
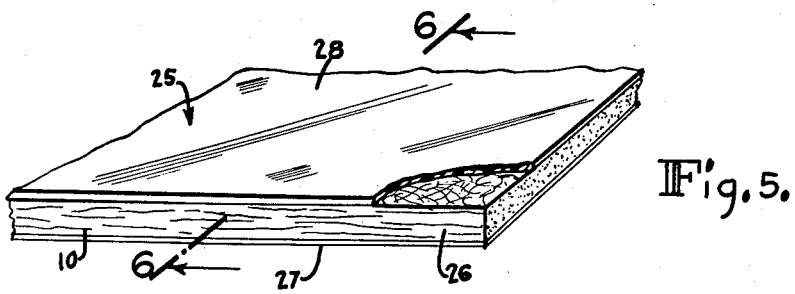
Figure 5 is a perspective view partially broken away illustrating a separator embodying the invention comprising a reticulate layer of absorbent cellulosic fibers provided externally on both faces with smooth calendered surfaces.
Figure 6:
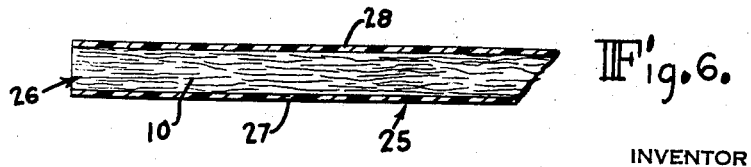
Figure 6 is a transverse section taken along lines 6—6 of Figure 5.

In a further embodiment of the invention as shown in Figures 5 and 6, the separator 25 may be composed simply of a reticulate layer 26 of cellulosic fibers 10 whose opposite outer surfaces are provided with smooth calendered faces 27 and 28, composed, for example, of cellulosic binder such as viscose.

The external surfaces 24, 27 and 28 of the reticulate layers 23 and 26 of Figures 4, 5 and 6 are advantageously smooth, thin and distortable so that when such separators are interposed between adjacent pairs of electrodes whose faces abut the said smooth faces and the reticulate layers are then wetted with electrolyte said reticulate layers will swell and cause intimate face to face fits between the smooth layers 24, 27 and 28 and the adjoining faces of the electrodes. The distortable nature of the faces 24, 27 and 28 will make them fit the faces of the electrodes without gaps notwithstanding surface irregularities of the electrodes particularly when said electrodes comprise porous carriers covered with metal particles agglomerated by sintering and impregnated with active material.

One manner of securing the smooth and highly distortable bordering surfaces 24, 27 and 28 is by providing a thin film of the viscose bonding adhesive to the fibers of the reticulate cellulosic structure, this film being applied as a glazed coating to the required surfaces of the reticulate layers 23 and 26. These smooth surfaces also may be obtained mechanically as by "satinizing" or "hot pressing." For example, by pressing adhesive wet layers 23 and 26 between a pair of heated rollers (not shown) one of which has a smooth surface and which revolves at a different speed from the other, the faster turning roller exerts a rubbing smoothing or calendering action on the surfaces of the absorbent layers 23 or 26 as the case may be.

In using separators of the character described in the fabrication of electrolytic cells, a separator of one of the types described above, for example, separator 25 is interposed between adjacent electrodes 29 and 30 of opposite polarity. In the dry state, the surface irregularities of the electrodes as seen in Figure 7 leave voids or gaps G between said surfaces and the outer or smooth distortable surfaces 27 and 28 of the separator. However, when the assembled separator 25 and electrodes 29 and 30 are confined in a limited space, for example, a casing, and the separator is saturated with electrolyte, its absorbent cellulosic fibers 10 swell causing deformation of the distortable outer surfaces 27 and 28 of the separator and their complete filling of the gaps as seen in Figure 8. In fact the pressure caused by the fiber swelling is sufficient to provide an extremely intimate fit between adjacent electrode and separator surfaces, the separator surfaces becoming substantial matrices of the faces of the adjacent electrode surfaces, without the necessity of resorting to extremely high pressures as taught in the aforesaid Jeannin patent. The same type of surface intimacy occurs when others of the separators herein described are used instead specifically of the separator 25.

Due to the affinity of the absorbent elements 10 for water, particularly when these elements are cellulosic fibers, such a separator is permanently saturated with electrolyte, and the volume of the solid parts by which it is constituted is a substantially negligible fraction of the space between the plates. In this way, on the one hand, a maximum amount of electrolyte is retained between the electrode plates, and, on the other hand, the motion of the electrolyte not only is not hindered by the separator, but is promoted by the said separator.

As a matter of fact, the said separator constitutes a kind of "gel" which is pervious and closely engages the faces of the electrodes while it is not necessary to bring the plates extremely close together in a way, crushing them against the separator as is done by applying a high pressure as in the Jeannin patent. Moreover, the "gel" entirely fills the meshes of the synthetic fiber backing when separators including the latter are employed.

In an alkaline cadmium-nickel storage cell, a minimum amount of electrolyte is needed between the electrodes, for the electrochemical reactions which take place in such a cell bring about variable hydration states of the active materials (positive and negative) during the charging and discharging.

Particularly, it is known that, during the charging operation, the hydroxides in the positive electrode release a part of their water and so does the hydroxide in the negative electrodes which is brought to the metallic state. On the other hand, water is chemically fixed by the electrodes of both polarities during the discharge.

From the experimental work I have performed, it has been noted that in batteries of the kind to which the invention applies (alkaline gas-tight batteries), the volume of the water released during the charge and inversely fixed during the discharge, was about 0.75 cm.$^3$ for one ampere-hour.

To retain the layer of electrolyte needed for the ionic exchanges in the separator at the end of the discharge, i.e. at the moment when the electrolyte is the more deprived of water, it is therefore necessary for the separator to contain an amount of electrolyte of about 1 cm.$^3$ for one ampere-hour. If the amount is inferior to this limit, the battery will be, in a kind of way, choked by want of electrolyte at the end of its discharge. On the other hand, this want of electrolyte in the separator, i.e. between the electrodes, has another bad consequence which is an increase in loss of charge when not in use.

According to the invention, in order to insure the presence of electrolyte between the electrodes at any time, even at the end of the discharge, the volume of the space between two electrodes, the opposite areas of which correspond to a capacity of one ampere-hour, must be of more than one cubic centimeter and, preferably, of about two cubic centimeters. However, it seems preferable that the thickness of the said space should not be above 0.3 to 0.4 mm.

In other terms, the opposite electrode areas corresponding to one ampere-hour, must be at least equal to 30 cm.$^2$ and, preferably of about 60 cm.$^2$ in order to satisfy the above-mentioned conditions. It is evident that the larger is the area of the plates or electrodes corresponding to one ampere-hour, the smaller should be the thickness of the space between the plates or electrodes, in order to keep the volume of the space in the desired range.

In order to compensate for the apparent withdrawal of water from between the electrodes at the end of the discharge, according to the invention, it is advantageous, moreover, to provide a store of free electrolyte in the casing of the storage cell, said store corresponding to the amount of water which is taken off, i.e. of about 1 cm.$^3$ for 1 ampere-hour.

Due to the highly absorbing character of the separators of this invention, the said store may easily and quickly act to fill the voids which are created during the high-rate discharges in the spaces between the electrodes.

Inversely, the mobility of the electrolyte in these absorbent separators being very high, the water released by the hydroxides during the charging operation can easily escape from the spaces between the electrodes without exerting a pressure upon them which would tend to move them apart.

This store of electrolyte may be placed at the lower part of the cell casing, in which case the stored electrolyte rises between the electrodes because of the capillarity (wick-effect) in the separators between the electrodes at the moment it is needed. This store of electrolyte may also be placed to one side of the casing, preferably at the side adjacent to the edges of the electrodes. More advantageously as seen in Figure 9, the stack of electrodes 29 and 30 and separators 25 may be arranged so that their lower ends abut the bottom of the casing 31 with a space between their upper ends and the casing cover 32 so that stored electrolyte 33 may be placed above the upper ends of the assembled electrode and separator pile. The movements of the electrolyte are then facilitated since gravity action is added to the action of capillarity to move the store of electrolyte into place when it is needed. The extra reserve of electrolyte in the space above the electrodes is optional and can be eliminated if desired.

Heretofore cellulose containing separators have not been found satisfactory in storage cells or batteries because, when in contact with the oxygen evolved at the end of the charging by the positive plates, the cellulose has been damaged and then progressively destroyed by oxidation. Thus, carbon dioxide is evolved, which carbon dioxide is fixed by the electrolyte as carbonate, so that in the conventional alkaline storage cells the use of cellulosic types of separators had been practically given up. Moreover, such known separators made of regenerated cellulose fabrics or sheets do not constitute reticulated structures with highly pervious fine meshes.

However, when electrolytic cells and especially storage batteries are made according to the present invention, i.e. when separators made of reticulated structures of absorbent particles and especially of cellulosic fibers which fill up the whole space between the plates by swelling as described herein are used, new and unexpected results are obtained as compared to the conventional storage batteries heretofore known that have used some types of cellulosic separators.

In the first place, in the normal range of utilization of cells and batteries embodying the invention or of charging of such cells or storage batteries, a charging voltage is obtained, said charging voltage staying under 1.48 volts even at the end of the charging operation. As a consequence, the charge is effected without apparent evolution of gases in similar way as in the cells and storage batteries described in the said Jeannin United States Patent No. 2,646,455. This result, however, is obtained without requiring previous high compression of the stack of plates and separators as required in said patent.

Moreover, a still more surprising result is obtained. The cellulosic separators are preserved without damage between the electrodes during the use of cells and storage batteries of this invention. Exact explanations of this phenomena cannot be given. It is in contradiction with the results observed in earlier cells and batteries using cellulosic separators. However, it is to be noted that due to the absence of gaseous evolution, there is no physical destroying action by the gas bubbles on the "gel" which is formed by the cellulosic reticulated separator structures of this invention.

Moreover, in the case of storage batteries comprising negative cadmium electrodes, at the end of the charging operation the cadmium is in a finely divided metal state and as a consequence, very ready to absorb oxygen. Due to the high permeability of the cellulosic reticulated structure of the separators of this invention, the oxygen which may be present in the space between the electrodes is by preference fixed by the metallic cadmium, so that the cellulose is protected against oxidizing.

This hypothesis is corroborated by the fact that the protruding parts of the cellulosic reticulated structure (which is not in contact with the electrodes as seen in Figure 9) undergoes a rather quick destruction. This is the reason why it is advantageous, as has been already said, to associate a pervious unalterable backing e.g. the backings 19, 20, 24, 27 and 28 to the cellulosic reticulated structures, said backings, after the destruction of the cellulose fibers protruding around the outer edges of the electrodes as seen in Figure 9, preventing the short-circuiting between the edges of said electrodes.

Such backings are not therefore absolutely necessary in the spaces between the electrodes. However, in that location it has the advantage of supporting the cellulosic reticulated structures which are not physically very strong.

The following example will help understanding how the invention may be practiced.

*Example.*—Thirteen positive electrode plates 29 (nickel hydroxide) and fourteen negative electrode plates 30 (cadmium hydroxide) made of sintered metal, thin, flat and rectangular, 15 cm. high and 7 cm. long, respectively impregnated with nickel hydroxide and cadmium hydroxide, are piled up in alternating order with separator sheets 17 of larger area than the areas of the said plates, said sheets being made of a cellulosic fiber layer 18 and a plastic material fiber layers 19 and 20 agglomerated by a cellulosic binder (viscose). The thickness of such sheets in the dry state is of 0.26 mm.

The stack thus assembled is introduced in a strong insulating casing 31 by slight forcing in such a way that the external faces of the opposite end plates press against the inner walls of the casing 31 while being optionally insulated from said walls. Then about 135 cm.$^3$ of a solution of potassium hydroxide at 20° Beaumé (density 1.16) or more are introduced in the casing 31. The storage cell thus constituted is then electrically activated. Then the casing 31 is tightly closed by a cover 32 which is sealed to the casing. Terminals 34 and 35 connected in conventional ways to the electrode plates protruding through the cover 32. Such a storage cell 36 has a capacity of about 40 to 45 amperes-hour. It is able to withstand a permanent charging current of 4 amperes (about C/10) until the end of the charging operation and even as an overcharge, without apparent gaseous evolution, and after charging it can give discharges at intensities up to several hundred amperes (up to 20 C) without inconvenience. Groups of said cells 36 may be serially or parallelly connected to provide storage batteries of desired voltage and current output ratings.

Results of like kind may be obtained with separators 23 (Figure 4) made of a thin fabric layer 22 of polyamide or any other insulating synthetic fiber unaltered by the potassium hydroxide (e.g. vinyl chloride and its copolymers) joined to a layer of cellulosic fibers 10 forming a reticulated structure, at least upon one face. Any of the other separators 13, 15, 17 or 25 of Figures 1, 2, 3, 5 and 6 may be used with similar desirable results.

It is understood that variations may be made in the embodiments which have been described within the scope of the claims without departing from the scope of the present invention or limitation to the exact details shown and described.

What is claimed is:

1. An electrolytic cell and particularly a secondary cell of the alkaline, cadmium-nickel type which operates without substantial gas evolution comprising a casing, electrolyte, at least one positive electrode and one negative electrode and a separator diaphragm positioned between the electrodes, said electrodes and interposed separator being confined by the casing and said separator consisting of long, absorbent cellulosic fibers disposed in substantial parallelism with partial intermingling of fibers and joined at random points by cellulosic binder to provide a reticulate fiber mass whose fibers swell when wetted by the electrolyte to substantially fill the space between the electrodes and lie in intimate and complete contact with the entire facing surfaces of the latter.

2. The cell of claim 1 in which said absorbent fibers are of cellulose joined at random points by cellulosic binder and in which the separator has smooth deformable outer surfaces.

3. The cell of claim 1 in which long fibers of insulating material substantially unaffected by the electrolyte are provided in conjunction with the absorbent fibers.

4. An electrolytic cell and particularly a secondary cell of the alkaline, cadmium-nickel type which operates without substantial gas evolution comprising a casing, electrolyte, alternately disposed positive and negative electrodes and separator diaphragms between adjacent surfaces of the electrode, the assembly of electrodes and separator diaphragms being confined by the casing and said separators consisting of long, absorbent cellulosic fibers disposed in substantial parallelism with some intermingling of fibers joined at random points by cellulosic binder to provide a reticulate fiber mass whose fibers swell when wetted by the electrolyte to substantially fill the space in which they are disposed and to be in intimate and complete contact with the entire facing surfaces of the electrodes between which they lie.

5. An electrolytic cell and particularly a secondary cell of the alkaline, cadmium-nickel type which operates without substantial gas evolution comprising a sealed casing, electrolyte therein, at least one positive electrode and one negative electrode in the casing and a separator diaphragm positioned between the electrodes, said electrodes and interposed separator diaphragm being confined by the casing against movement apart and said separator consisting of insulating fibers unaffected by the electrolyte and absorbent long cellulosic fibers disposed in substantial parallelism with partial intermingling joined at random points by cellulosic binder to provide a reticulate fiber mass whose cellulosic fibers swell when wetted by the electrolyte to expand the separator and so that it substantially fills the space between the electrodes and lies in intimate and complete contact with the entire facing surfaces of the electrodes forming matrices of these surfaces.

6. An electrolytic cell and particularly a secondary cell of the alkaline type which operates without substantial gas evolution comprising a sealed casing, electrolyte therein, a plurality of alternately disposed positive and negative electrodes and separator diaphragms between adjacent surfaces of the electrodes, the assembly of electrodes and separator diaphragms being confined against movement apart by the casing and said separators consisting of long insulating fibers unaffected by the electrolyte and absorbent long cellulosic fibers disposed in substantial parallelism with partial intermingling joined at random points by cellulosic binder to provide a reticulate fiber mass whose cellulosic fiber content swells when wetted by the electrolyte to expand the separator diaphragms so that they substantially fill the spaces between the electrodes between which they are positioned and each lie in intimate and complete contact with the entire facing surfaces of such electrodes forming matrices of these surfaces.

7. Separators for electrolytic cells and for secondary cells of the alkaline type consisting of a layer-like mass of substantially parallelly disposed, partially intermingled and reticulately arranged long absorbent cellulosic fibers joined at random points by viscose bonding medium.

8. Separators for electrolytic cells and for secondary cells of the alkaline type consisting of a layer-like mass of intermingled and reticulately arranged long absorbent cellulosic fibers joined at random points by cellulosic bonding medium, said mass having smooth-faced, deformable outer surfaces of viscose.

9. Separators for electrolytic cells and for secondary cells of the alkaline type consisting of a layer-like mass of intermingled and reticulately arranged long absorbent cellulosic fibers joined at random points by viscose bonding medium and a layer of insulating long fibers of synthetic plastic material unaffected by the electrolyte joined thereto.

10. An electrolytic cell and particularly a secondary cell of the alkaline cadmium-nickel type which operates without substantial gas evolution comprising a casing, electrolyte, at least one positive electrode and one negative electrode and a separator diaphragm positioned between the electrodes, said electrodes and interposed separator being confined by the casing and said separator consisting of absorbent long cellulosic fibers disposed in substantial parallelism with partial intermingling of fibers and joined at random points by cellulosic binder to provide a reticulate fiber mass whose fibers swell when wetted by the electrolyte to substantially fill the space between the electrodes and lie in intimate and complete contact with the entire facing surfaces of the latter, the volume of the space between the positive and negative electrodes lying between 1 and 2 cm.³/ah.

11. The cell of claim 10 in which the separator has smooth deformable outer surfaces.

12. The cell of claim 10 in which long fibers of insulating material substantially unaffected by the electrolyte are provided in conjunction with the absorbent fibers.

13. An electrolytic cell and particularly a secondary cell of the alkaline cadmium-nickel type which operates without substantial gas evolution comprising a casing, electrolyte, alternately disposed positive and negative electrodes and separator diaphragms between adjacent surfaces of the electrodes, the assembly of electrodes and separator diaphragms being confined by the casing and said separators consisting of absorbent long cellulosic fibers disposed in substantial parallelism with some intermingling of fibers joined at random points by cellulosic binder to provide a reticulate fiber mass whose fibers swell when wetted by the electrolyte to substantially fill the space in which they are disposed and to be in intimate and complete contact with the entire facing surfaces of the electrodes between which they lie, the volume of the space between the positive and negative electrodes lying between 1 and 2 cm.³/ah.

14. An electrolytic cell and particularly a secondary cell of the alkaline cadmium-nickel type which operates without substantial gas evolution comprising a sealed casing, electrolyte therein, at least one positive electrode and one negative electrode in the casing and a separator diaphragm positioned between the electrodes, said electrodes and interposed separator diaphragm being confined by the casing against movement apart and said separator consisting of insulating fibers unaffected by the electrolyte and absorbent long cellulosic fibers disposed in substantial parallelism with partial intermingling joined at random points by cellulosic binder to provide a reticulate fiber mass whose cellulosic fibers swell when wetted by the electrolyte to expand the separator and so that it substantially fills the space between the electrodes and lies in intimate and complete contact with the entire facing surfaces of the electrodes forming matrices of these surfaces, the volume of the space between the positive and negative electrodes lying between 1 and 2 cm.³/ah.

15. An electrolytic cell and particularly a secondary cell of the alkaline type which operates without substantial gas evolution comprising a sealed casing, electrolyte therein, a plurality of alternately disposed positive and negative electrodes and separator diaphragms between adjacent surfaces of the electrodes, the assembly of electrodes and separator diaphragms being confined against movement apart by the casing and said separators consisting of long insulating fibers unaffected by the electrolyte and absorbent long cellulosic fibers disposed in substantial parallelism with partial intermingling joined at random points by cellulosic binder to provide a reticulate fiber mass whose cellulosic fiber content swells when wetted by the electrolyte to expand the separator diaphragms so that they substantially fill the spaces between the electrodes between which they are positioned and each lie in intimate and complete contact with the entire facing surfaces of such electrodes forming matrices of these surfaces, the volume of the space between the positive and negative electrodes lying between 1 and 2 cm.³/ah.

References Cited in the file of this patent

UNITED STATES PATENTS

| | | |
|---|---|---|
| 2,511,887 | Vinal | June 20, 1950 |
| 2,531,504 | Dillehay et al. | Nov. 28, 1950 |
| 2,578,534 | Giles et al. | Dec. 11, 1951 |
| 2,591,755 | Wilson et al. | Apr. 8, 1952 |
| 2,594,713 | Andre | Apr. 29, 1952 |
| 2,646,455 | Jeannin | July 21, 1953 |